United States Patent [19]
Boyd

[11] 3,948,080
[45] Apr. 6, 1976

[54] APPARATUS FOR TESTING THE TRACTION PROPERTIES OF PNEUMATIC TIRES

[75] Inventor: Patrick L. Boyd, Landover Hills, Md.

[73] Assignee: The United States of America as represented by the Secretary of the Department of Transportation, Washington, D.C.

[22] Filed: Sept. 3, 1974

[21] Appl. No.: 502,832

[52] U.S. Cl. .......................................... 73/9; 73/146
[51] Int. Cl.² .................. G01N 19/02; G01M 17/02
[58] Field of Search ............................. 73/9, 146, 8

[56] References Cited
UNITED STATES PATENTS

| | | | |
|---|---|---|---|
| 2,496,405 | 2/1950 | Foufounis | 73/9 |
| 3,301,039 | 1/1967 | Kummer | 73/9 |

OTHER PUBLICATIONS

Beauregard, C. and R. G. McNall, "Tire Cornering Traction Test Methods," SAE Paper No. 730,147, presented at SAE National Automotive Engineering Congress, Jan. 8–12, 1973.

Dugoff, H. and B. J. Brown, "Measurement of Tire Shear Forces," SAE Paper No. 700,092, presented at SAENAE Congress, Jan. 12–16, 1970.

Cortese, A. D. and C. S. Rockafellow, "General Motors Proving Ground Tire Cornering Test Vehicle," SAE Paper No. 710,092, presented at SAENAE Congress, Jan. 11–15, 1971.

*Primary Examiner*—Richard C. Queisser
*Assistant Examiner*—John S. Appleman
*Attorney, Agent, or Firm*—Herbert E. Farmer; Harold P. Deeley, Jr.

[57] ABSTRACT

An apparatus is disclosed for testing the traction properties of pneumatic tires. A frame is provided having a plurality of structural members. A suspension system having upper and lower arms each having first and second ends is rotatably attached to the frame at the first ends of the upper and lower arms. A hub assembly having a triaxial force transducer mounted therein is attached to the second ends of the suspension system by means of a pair of spherical bearings. An aperture extending through a rear wall of the hub assembly, through the triaxial force transducer and through a front wall of the hub assembly supports a driven axle for applying driving or restraining torque to a pneumatic tire mounted on the front surface of the hub assembly. A pair of bearings which rotatably support the driven axle are respectively attached to first and second flanges of the triaxial force transducer to cancel the sensing of a force having components in the direction of tire travel and in the direction perpendicular to the road surface caused by a non-parallel orientation between the axis of rotation of the driving shaft and the axis of rotation of the pneumatic tire (the driven axle).

2 Claims, 5 Drawing Figures

APPARATUS FOR TESTING THE TRACTION PROPERTIES OF PNEUMATIC TIRES

BACKGROUND OF THE INVENTION

1. Field of the Invention

The invention relates to tire testing apparatus of the type which measures the vertical load and traction forces in longitudinal and lateral directions with respect to the direction of tire travel on pneumatic tires while in contact with pavement. More specifically, the invention is concerned with tire testing machines of the aforementioned type which use force transducers which include strain gauges for sensing the aforementioned forces.

2. Description of the Prior Art

One type of prior art tire testing machine is described in a publication authored by A. D. Cortese and C. S. Rockafellow entitled "General Motors Proving Ground Tire-Cornering Test Vehicle" which was prepared for presentation at the S.A.E. Automotive Engineering Congress, Detroit, Michigan, Jan. 11–15, 1971. Their solution for measuring tire traction forces consisted of using a towed trailer having a test tire, whose traction forces were being measured, suspended from a frame attached to the trailer by means of a suspension system having a rigid axle housing, four trailing arms and coil-springs similar to those used in conventional automotive rear suspension systems. A triaxial force transducer was utilized to measure the traction forces. Their apparatus utilized a conventional disc brake assembly for generating slip between the tire surface and the pavement. Because this apparatus did not utilize a driven axle to produce slip between the tire and pavement surface, it was impossible to sustain steady state slip rates above approximately 15%. It also was impossible, with this apparatus, to produce driven slip rates which approximate those conditions during which a tire is rotating faster than the rate of speed of the trailer to which the tire testing apparatus was secured.

A second type of prior art apparatus was described in a paper presented to the Society of Automotive Engineers at the National Automotive Engineering Congress, Detroit, Michigan, during Jan. 8–12, 1973. This paper was entitled "Tire Cornering Traction Test Methods" and was authored by C. Beauregard and R. G. McNall. The apparatus, like the one described in the publication discussed supra, is secured to the frame of a towed trailer. Upper and lower arms suspended a tire and hub assembly from the frame of the trailer. Spherical bearings attached the ends of the upper and lower arms to the hub assembly and to the frame. Slip between the tire and road surface was produced by the application of a braking force applied by a disc brake rotor attached to the rotating part of the hub assembly to which the tire was attached. A biaxial force transducer was used to measure the traction force in the plane of the road surface parallel to the direction of tire travel and the load applied to the tire in a direction perpendicular to the road surface. A second independent force transducer was used to measure the traction force in the plane of the road surface perpendicular to the direction of tire travel. This device suffers from the same disadvantages of the device described supra. Additionally, this apparatus required the use of two independent force transducers.

A third prior art pneumatic tire testing apparatus was described in a paper entitled "Measurement of Tire Shear Forces" authored by Howard Dugoff and B. J. Brown for the Automotive Engineering Congress held at Detroit, Michigan from Jan. 12–16, 1970. This apparatus and a similar apparatus developed at the National Aeronautics and Space Administration used a truck without a separate trailer having a wheel assembly suspended from the truck frame to test a tire. The suspension systems of these two apparatus utilized a ball spline linear bearing to permit vertical movement of the tire with respect to the truck frame and the surface on which it was being tested. The vertical load applied to the test tire was applied by a variable volume gas cylinder. The disadvantage of using a ball spline linear bearing for permitting vertical motion of the wheel assembly is that it has a greater tendency to bind than a wheel assembly suspended by upper and lower arms pivoted upon spherical bearings. Vertical movements of the truck frame produce fluctuation in the volume of the load gas cylinder which changes the load applied to the tire. Unlike the apparatus described in the preceding publications, the test tire in each of these apparatus has slip between it and the road surface produced by means of a motor-driven live axle. The forces sustained by the tire during testing were sensed by a combination of a biaxial transducer which measures the components of force in the plane of the surface on which the tire is moving and a strain gauge member which senses the component of force normal to the plane of the surface on which the tire is rolling. The use of the ball spline suspension made it necessary to mount the biaxial force transducer in a plane parallel to the surface of the road on which the tire being tested is rolling. The use of a biaxial force transducer to measure force components in a plane parallel to the road surface on which the tire is being tested and the use of a vertical strain gauge member to measure the force applied to the tire normal to the plane of the road surface requires a massive unsprung structure which results in tire load fluctuation due to the inertial loads imposed by this structure. Additionally, mounting of two independent force transducers presents severe spatial location problems in the wheel assembly area.

SUMMARY OF THE DISCLOSURE

The disadvantages and limitations of the prior art pneumatic tire traction force measuring apparatus are solved by the present invention which provides a pneumatic tire traction force measuring apparatus which incorporates a driven axle to apply torque to the tire being tested and senses the traction forces of the tire by means of a triaxial force transducer.

The combination of a driven axle and triaxial force transducer in a pneumatic tire traction force apparatus has the advantage over the prior art apparatus of permitting force measurements during sustained periods of slip higher than 15% or during driving slip while sensing all components of traction force with one transducer. This capability is totally foreign to the prior art apparatus.

A pneumatic tire traction force measuring system constructed according to the present invention has a frame which has a suspension system consisting of upper and lower arms that are attached to the frame by spherical bearings. Each arm has two legs having two ends, one end of each of the legs being joined together to form a vertex, the other ends being joined to the frame by means of the spherical bearings. A hub assembly having a pneumatic tire rotatably attached thereto is secured by means of spherical bearings to the respective vertices of the legs of the upper and lower arms of the suspension system. The hub assembly includes a housing having front and rear walls which partially enclose a triaxial force transducer. An aperture extends through the rear wall of the housing, through the triaxial force transducer, and through the front wall of the housing to receive an axle used for driving the pneumatic tire being tested. The triaxial force transducer has first and second flanges which respectively have directly secured thereto a pair of bearings used for rotatably supporting the driven axle. When the driving shaft assumes an inclination which is not coaxial with the driven axle, the two axle bearings are loaded with equal and opposite force having components in the direction of tire travel and in the direction perpendicular to the road surface. The tire traction force measurement must be independent of these bearing loads which vary with drive shaft angularity. The mounting of the bearings on the respective first and second flanges of the triaxial force transducer produces cancellation of these bearing loads because equal forces are applied in opposite directions to the respective flanges of the triaxial force transducer.

The novel features which are considered to be characteristic of this invention are set forth in the appended claims. The invention itself, however, both to its organizations and method of operation, as well as additional objects and advantages thereof, will be best understood from the following description when read in conjunction with the accompanying drawings, in which:

DETAILED DESCRIPTION OF THE INVENTION

Figure 1:
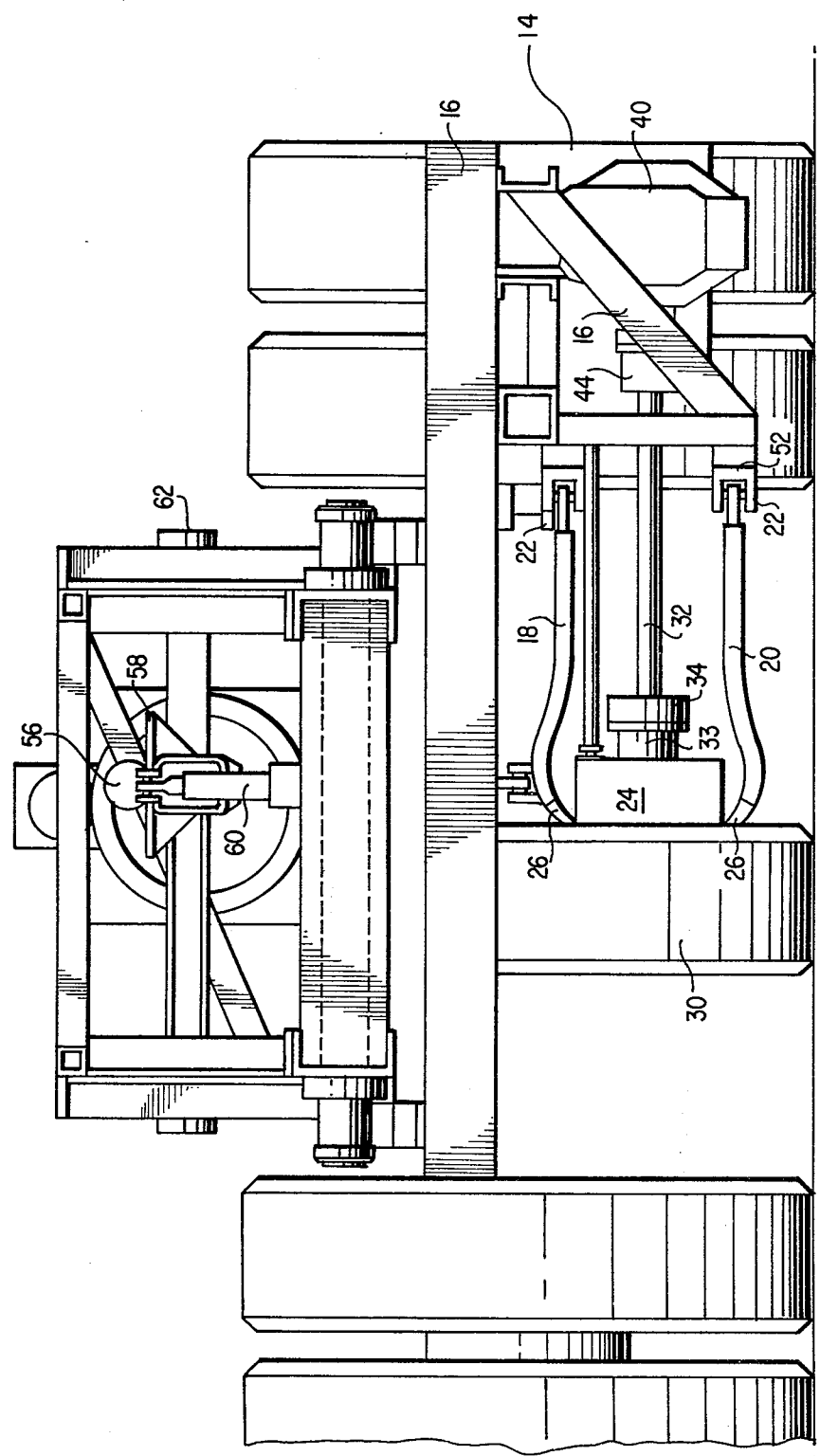
FIG. 1 is a rear view showing the invention as employed in a complete pneumatic tire traction force measuring apparatus.
Figure 2:
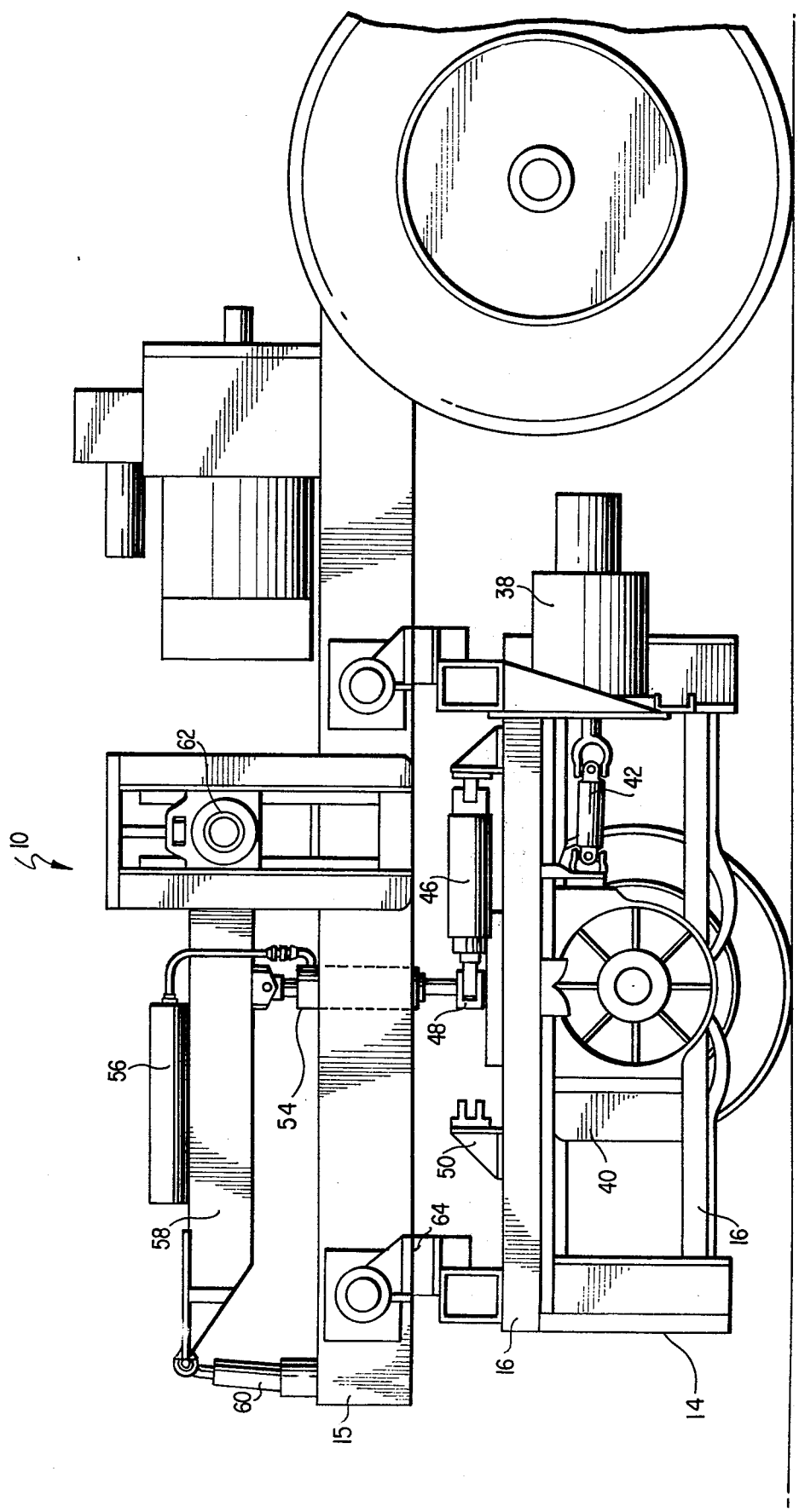
FIG. 2 is a side view showing the invention as employed in a complete pnuematic tire traction force measuring apparatus.
Figure 3:
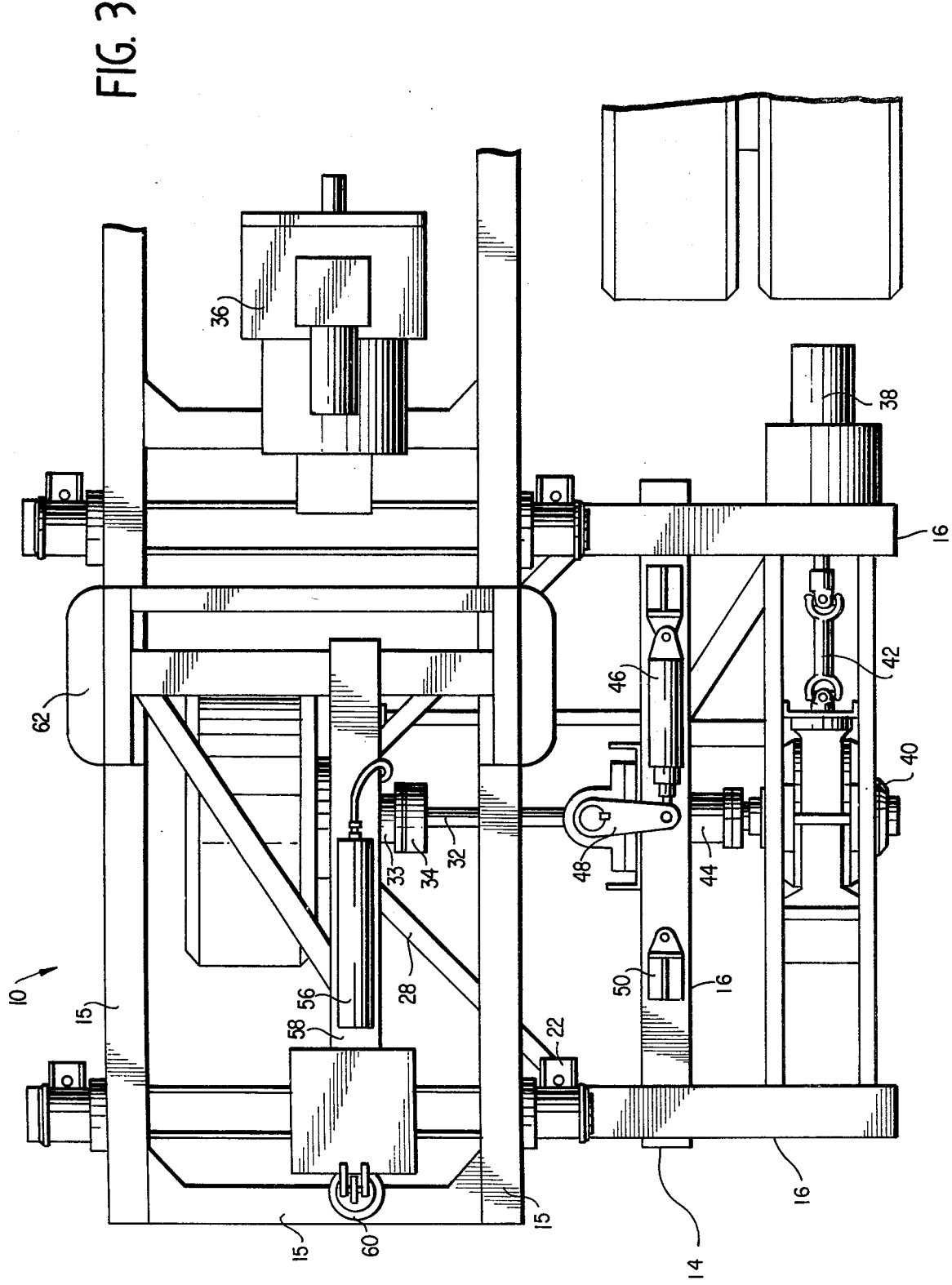
FIG. 3 is a top view showing the invention as employed in a complete pneumatic tire traction force measuring apparatus.

Referring to FIGS. 1 through 3, a truck with a tire test fixture attached to the truck frame 10 is used to carry the invention. The test tire fixture frame 14 includes a plurality of structural members designated by numeral 16. These members are joined together to form a rigid frame which is attached to the truck frame 15. A suspension system having upper and lower arms 18 and 20, respectively, is joined to the frame 14 by means of spherical bearings 22. The upper arm 18 and the lower arm 20 are joined to a hub assembly 24 (described in detail in FIG. 5) by means of spherical bearings 26. The spherical bearings 22 and 26, respectively, comprise means for rotatably attaching the suspension system to the test tire fixture frame 14 and the suspension system to the hub assembly 24. The respective upper arm and lower arm 18 and 20 each have a pair of equal length legs 28 which join at one end to form a vertex which is attached to the hub assembly by means of the spherical bearings 26. Pneumatic tire 30, whose traction properties are to be tested by the invention, is mounted to the hub assembly 24 by means of a bolt circle shown in FIG. 5. A driven axle 33 is rotatably supported in the hub assembly 24 to permit the application of driving or restraining torque to pneumatic tire 30 during the testing of the traction forces of a pneumatic tire by the invention. A constant velocity universal joint 34 is secured between the drive shaft 32 and axle 33. Shaft 32, driven axle 33 and constant velocity universal joint 34 comprise a drive means. The source of driving torque or restraining torque which is applied to the pneumatic tire 30 comprises a variable displacement hydraulic pump 36 which is connected to the truck drive shaft (not shown) and a reversible fixed displacement hydraulic motor 38 which is coupled to the variable displacement hydraulic pump 36 by means of hydraulic lines (not shown). The output of the hydraulic motor 38 is applied to a right angle gear reducer 40 of well known construction by means of drive shaft 42. The right angle gear reducer includes the capability of having a changeable gear ratio to permit the changing of the relative velocity of the driven or restrained tire 30 with respect to the angular velocity of the hydraulic motor 38. A constant slip between the tire and road surface is produced by the variable displacement hydraulic pump 36 and hydraulic motor 38 because the output of the pump 36 is a linear function of truck velocity. The output of the right angle gear reducer 40 is applied to a telescoping constant velocity universal joint 44 which drives shaft 32. A steering mechanism is provided for changing the angular inclination of the tire with respect to the direction of travel of the truck. The steering mechanism consists of a hydraulic steering actuator 46 which applies torque to steering crank 48 to turn wheel 30 with respect to the direction of travel of the truck. It should be noted that the hydraulic steering actuator 46 may be controlled from the inside of the truck cab by a servo mechanism which forms no part of the present invention. In order to maintain a fixed inclination of tire 30 with respect to the direction of travel of the truck, clevis 50 is secured to the frame assembly 14 to permit the attachment of a rigid member between the steering crank 48 and the clevis 50. Spacers 52 are provided between the point of attachment of the frame assembly with the ends of the upper and lower arms 18 and 20 to permit an adjustment in the amount of camber of the tire 30. A hydraulic cylinder 54 having one end open to atmospheric pressure and a nitrogen-charged accumulator 56 provide springing and damping of a load lever having a dead weight platform 58. A variable restriction valve (not shown) may be disposed between the hydraulic cylinder 54 and nitrogen-charged accumulator 56 to provide adjustment of the damping. The load lever having a dead weight platform 58 provides a load which may be varied prior to each tire test. Telescopic hydraulic cylinder 60 is provided to permit the raising of the tire 30 at the completion of the test procedure. Adjustable bearing assembly 62 permits the raising and lowering of the load lever axis. Spacers 64 permit the raising and lowering of the tire test fixture frame assembly to accommodate tires of different radii.

Figure 4:
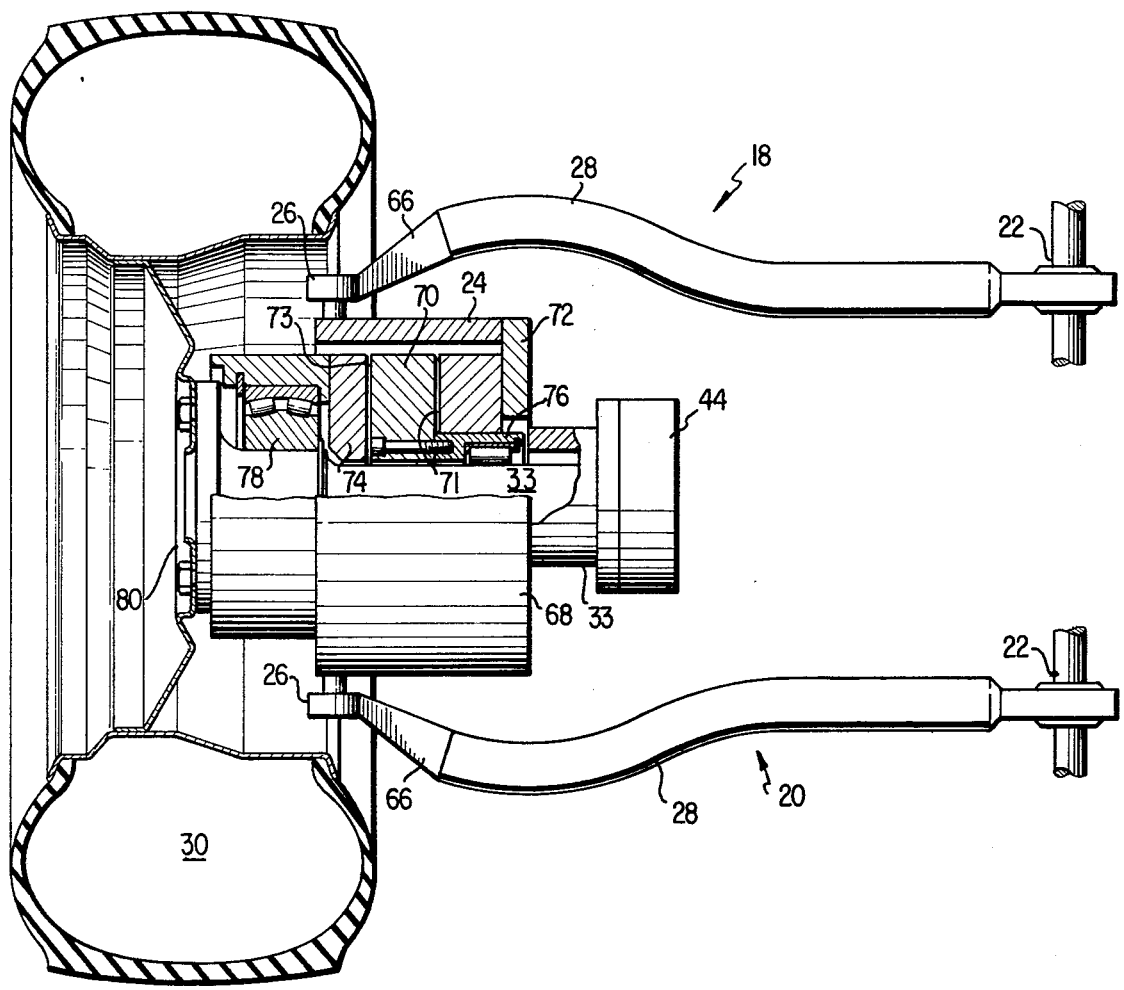
FIG. 4 is a view showing a partial section of the hub assembly including the triaxial force transducer and the upper and lower arms of the suspension system.

Referring to FIG. 4, the suspension system is shown in detail. Upper and lower suspension arms, respectively, 18 and 20 are each comprised of a pair of legs 28 having two ends. Only one leg 28 of each arm 18 and 20 is shown in FIG. 4. The legs are joined together at one end to form a vertex 66. The vertex 66 is joined to hub assembly 24 by means of spherical bearings 26.

The other ends of the legs 28 are attached to the frame 14 (not shown) by means of spherical bearings 22. The hub assembly 24 has a housing 68 within which triaxial force transducer 70 is shown sectionally. An aperture (not shown) extends through the rear wall 72 of housing 68, through triaxial force transducer 70 and through the front wall 74 of housing 68 to receive driven axle 33. A pair of bearings 76 and 78 rotatably support axle 33 and pneumatic tire 30. The bearings 76 and 78 are respectively joined to first and second flanges 71 and 73 of the triaxial transducer 70. The front surface of the driven axle 33 is bored and threaded to permit the engagement of wheel studs to secure pneumatic tire 30 to hub assembly 24.

Triaxial force transducers are well known in the art. The preferred type of triaxial force transducer used in the present invention is a modification of the triaxial force transducer described in the publication entitled "General Motors Proving Ground Tire Cornering Test Vehicle" authored by A. D. Crotese and C. S. Rockafellow discussed in the description of the prior art above. This type of triaxial force transducer is presently offered for sale under the identification (K. J. Law) "Model 2500 Triaxial Force Transducer for Spindle and Disk Brake Assembly" manufactured by K. J. Law Engineers, Inc., Detroit, Michigan.

Figure 5:
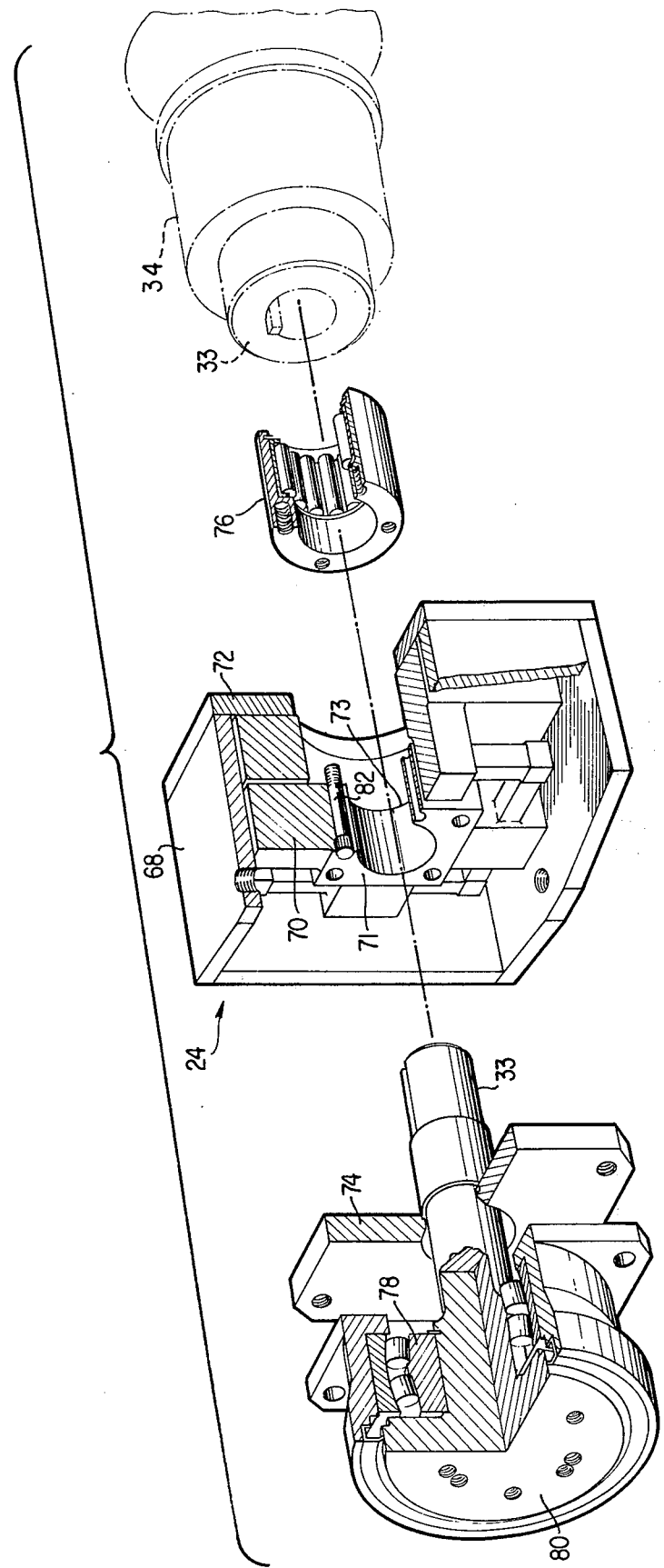
FIG. 5 is a detailed view of the hub assembly including sections showing the mounting arrangement of the bearings for supporting the driven shaft.

Referring to FIG. 5, there is shown a detailed illustration of the hub assembly including the modifications made to the K. J. Law Model 2500 Triaxial Force Transducer. Triaxial force transducer 70 has been centrally bored to receive driven axle 33 to permit the application of restraining or driving torque to pneumatic tire 30 during testing. The hub assembly 24 has front and rear walls 72 and 74, respectively, which are drilled to receive the driven axle 33. The size of the hole through the rear wall 72 of housing 68 is large enough to receive bearing 76. The cage of bearing 76 is bored and threaded to receive mounting studs 82. Bearing assembly 76 is attached directly to the flange 73 of transducer 70. Bearing assembly 78 is attached directly to wall 74 of transducer 70. The front wall 74 is in turn directly attached to flange 71 of transducer 70. This assembly causes any forces which are applied to bearing 76 due to angularity of drive shaft 32 with respect to axle 33 to be applied directly to the flange 73 of transducer 70 without their application to other parts of the hub assembly 68. The equal and opposite load on bearing 78 due to drive shaft angularity is applied to flange 71 of transducer 70. Thus loading on bearing 76 and 78 due to drive shaft angularity are cancelled. The diameter of the bore through triaxial transducer 70 is large enough to permit the passage of the front smaller diameter section of driven axle 33 into keyed engagement with the rear larger diameter section of driven axle 33.

In summary, the K. J. Law Model 2500 Triaxial Force Transducer has been modified to have a center bore in which the rear and front bearings 76 and 78 have been mounted respectively directly on the rear flange 73 and front wall 74 of the triaxial force transducer 70. This modification results in the application of any force, which is produced by a non-coaxial orientation of the drive shaft 32 with respect to the axis of rotation of the tire 30, (axle 33) to be loaded upon flange 73 while an equal and opposite reaction force is loaded on flange 71.

Since the triaxial force transducer from which the modified transducer of the present invention is constructed is well known in the art, a detailed description thereof will not be discussed in this specification. However, for purposes of general description, it should be noted that the triaxial force transducer used in this invention senses components of force in three orthogonal directions. The triaxial force transducer 70 has independent electrical output channels for transmitting the force components sensed in each of the three orthogonal directions. Since the electrical connections of the traixial force transducer are well known and form no part of the present invention, they are not shown in the drawings.

While there has been illustrated and described what is considered to be a preferred embodiment of the present invention, it will be appreciated that numerous changes and modifications are likely to occur to those skilled in the art and it is intended that the appended claims cover all those changes and modifications which fall within the true spirit and scope of the present invention.

What is claimed as new and desired to be secured by Letters Patent of the United States is:

1. In an apparatus of the type for measuring the traction forces of pneumatic tires, the combination comprising:
    a. a frame;
    b. a suspension system;
    c. a hub assembly having said pneumatic tire rotatably secured thereto;
    d. means for rotatably attaching said suspension system to said hub assembly;
    e. means for rotatably attaching said suspension system to said frame;
    f. a triaxial force transducer attached to said hub assembly for sensing traction and loading forces applied to said tire; and
    g. a drive means rotatably coupled to said pneumatic tire for applying rotational torque thereto,
    wherein said drive means comprises:
        a drive shaft rotatably coupled to a driven axle by means of a constant velocity universal joint, said driven axle being rotatably coupled to said pneumatic tire,
    wherein said hub assembly further comprises:
        a housing having front and rear walls which partially enclose said traixial force transducer;
        an aperture extending through said rear wall, said triaxial force transducer and said front wall for receiving said driven axle; and
        a pair of bearings for rotatably supporting said driven axle and said pneumatic tire; said bearings being respectively directly secured to first and second flanges of said triaxial force transducer whereby a force applied to said transducer having components in a direction parallel to the direction of tire travel and in the direction perpendicular to the road surface caused by the application of torque to said pneumatic tire through a noncoaxial orientation of said drive shaft with respect to the axis of said driven axle is cancelled in said triaxial transducer,
    wherein said suspension system comprises:
        upper and lower arms each comprised of two legs of equal length having two ends; one end of each of said legs being joined together to form a vertex, said vertices being respectively connected to said hub assembly by said means for rotatably securing said suspension system to said hub assembly, the other end of each of said legs being connected to said frame by said means for rotatably securing said suspension system to said frame, wherein said means for attaching said hub assembly to said suspension system comprises a pair of spherical bearings; and wherein said means for attaching said suspension system to said frame comprises two pairs of spherical bearings.

2. In an apparatus for measuring the traction forces of pneumatic tires, the combination comprising:
   a. a frame;
   b. a suspension system comprised of upper and lower arms, each having first and second ends; the first end of each of said arms being attached to the frame by means of a rotatable coupling;
   c. a hub assembly having said pneumatic tire rotatably secured thereto;
   d. a pair of spherical bearings respectively joining the second ends of the respective upper and lower arms to the hub assembly;
   e. a triaxial force transducer attached to said hub assembly for sensing traction forces of said pneumatic tire; and
   f. a drive means rotatably coupled to said pneumatic tire for applying rotational torque thereto, wherein the upper and lower suspension arms each comprise:
   two legs each having two ends, one end of each of said legs being joined together to form a vertex; said vertex of said upper and lower legs respectively being secured to said hub assembly by one of said spherical bearings, the other end of each of said legs being joined to said frame by means of a rotatable coupling, wherein said drive means comprises:
   a drive shaft rotatably coupled to a driven axle by means of a constant velocity universal joint, said driven axle being rotatably coupled to said pneumatic tire, and wherein said hub assembly further comprises:
   a housing having front and rear walls which partially enclose said triaxial force transducer;
   an aperture extending through said rear wall, said triaxial force transducer and said front wall for receiving said driven axle; and
   a pair of bearings for rotatably supporting said driven axle and said pneumatic tire; said bearings being respectively secured to first and second flanges of said triaxial force transducer whereby said transducer simultaneously senses the longitudinal and lateral shear forces and the normal force at the interface between the tire and the pavement surface.

* * * * *